United States Patent
Ricketts et al.

(10) Patent No.: US 10,114,755 B2
(45) Date of Patent: Oct. 30, 2018

(54) SYSTEM, METHOD, AND COMPUTER PROGRAM PRODUCT FOR WARMING A CACHE FOR A TASK LAUNCH

(71) Applicant: NVIDIA Corporation, Santa Clara, CA (US)

(72) Inventors: Scott Ricketts, San Francisco, CA (US); Nicholas Wang, Saratoga, CA (US); Shirish Gadre, Fremont, CA (US); Gentaro Hirota, San Francisco, CA (US); Robert Ohannessian, Jr., Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 428 days.

(21) Appl. No.: 13/918,786

(22) Filed: Jun. 14, 2013

(65) Prior Publication Data
US 2014/0372703 A1 Dec. 18, 2014

(51) Int. Cl.
*G06F 12/08* (2016.01)
*G06F 12/0897* (2016.01)

(52) U.S. Cl.
CPC .................. *G06F 12/0897* (2013.01)

(58) Field of Classification Search
CPC ............ G06F 9/3802; G06F 9/30047; G06F 9/30072; G06F 9/3013; G06F 9/383; G06F 9/3824; G06F 12/0862; G06F 12/0897
See application file for complete search history.

(56) References Cited

U.S. PATENT DOCUMENTS

| | | | | |
|---|---|---|---|---|
| 5,371,865 A | * | 12/1994 | Aikawa | G06F 9/383 711/125 |
| 6,119,222 A | * | 9/2000 | Shiell | G06F 9/3802 711/E12.057 |
| 2004/0260877 A1 | * | 12/2004 | Hooker | G06F 12/0815 711/118 |
| 2005/0060711 A1 | * | 3/2005 | Ericsson et al. | 718/107 |
| 2005/0210198 A1 | * | 9/2005 | Dimpsey et al. | 711/137 |
| 2005/0210199 A1 | * | 9/2005 | Dimpsey et al. | 711/137 |
| 2008/0104322 A1 | * | 5/2008 | Vanzante | G06F 12/0891 711/118 |
| 2009/0251476 A1 | * | 10/2009 | Jiao et al. | 345/543 |
| 2010/0201703 A1 | * | 8/2010 | Jiao | 345/589 |
| 2012/0110269 A1 | * | 5/2012 | Frank | G06F 9/30047 711/137 |
| 2013/0074088 A1 | * | 3/2013 | Purcell | G06F 9/4881 718/103 |

OTHER PUBLICATIONS

Karlsson, M., et al., "A Prefetching Technique for Irregular Accesses to Linked Data Structures," 6th IEEE Int. Symp. On High-Performance Computer Architecture, 2000, pp. 206-217.

* cited by examiner

*Primary Examiner* — Ann J Lo
*Assistant Examiner* — Jane Wei
(74) *Attorney, Agent, or Firm* — Zilka-Kotab, P.C.

(57) ABSTRACT

A system, method, and computer program product for warming a cache for a task launch is described. The method includes the steps of receiving a task data structure that defines a processing task, extracting information stored in a cache warming field of the task data structure, and, prior to executing the processing task, generating a cache warming instruction that is configured to load one or more entries of a cache storage with data fetched from a memory.

20 Claims, 8 Drawing Sheets

| Task Meta Data 400 |
|---|
| Program          410 |
| Constants        415 |
| Grid_Dimensions  420 |
| Block_Dimensions 430 |
| Resources        440 |
| Cache_Control    450 |
| Memory_Barriers  460 |
| Semaphores       470 |
| ⋮ |

*Fig. 4A*

| Program 410 |
|---|
| Program Offset  480 |
| Program Cache Warm Enable  482 |
| Program Cache Warm Entries  484 |

*Fig. 4B*

| Constants 415 |
|---|
| Constant Offset  490 |
| Constant Cache Warm Enable  492 |
| Constant Cache Warm Entries  494 |

*Fig. 4C*

SYSTEM, METHOD, AND COMPUTER PROGRAM PRODUCT FOR WARMING A CACHE FOR A TASK LAUNCH

This invention was made with Government support under LLNS subcontract B599861 awarded by DOE. The Government has certain rights in this invention.

FIELD OF THE INVENTION

The present invention relates to task management, and more particularly to launching a task for execution.

BACKGROUND

Processing tasks are typically implemented by generating a data structure in a memory, where the data structure includes information associated with instructions and data to be processed by those instructions. When a processing task is selected, for execution and launched, there is some amount of latency before execution of the processing task can begin. In particular, there is a latency resulting from the time needed to fetch the first program instruction for the processing task from the memory.

Thus, there is a need for addressing this issue and/or other issues associated with the prior art.

SUMMARY

A system, method, and computer program product for warming a cache for a task launch is described. The method includes the steps of receiving a task data structure that defines a processing task, extracting information stored in a cache warming field of the task data structure, and, prior to executing the processing task, generating a cache warming instruction that is configured to load one or more entries of a cache storage with data fetched from a memory.

BRIEF DESCRIPTION OF THE DRAWINGS

FIG. 4A illustrates a task data structure, in accordance with one embodiment;

FIG. 4B illustrates a program field within the task data structure of FIG. 4A, in accordance with one embodiment;

FIG. 4C illustrates a constant field within the task data structure of FIG. 4A, in accordance with one embodiment;

DETAILED DESCRIPTION

A cache warming mechanism for a multi-threaded processor is described below. In the context of the following description, the cache warming mechanism provides a means to reduce the latency incurred between the time when a processing task is eligible for launch to when the first instruction of the processing task is available for execution by the multi-threaded processor. A processing task is associated with a task data structure that encapsulates the task state necessary for configuring a processing unit within the multi-threaded processor to complete a subset of work (i.e., a program kernel configured to process data). In some possible embodiments, a central processing unit (CPU) is coupled to a parallel processing unit (PPU) and the PPU is configured to execute one or more processing tasks. The processing tasks are written to a memory accessible by the PPU by either a driver kernel executing on the CPU or predecessor processing tasks executed on the PPU. In order to launch a processing task on the PPU, a method call is sent to the PPU that points to a task data structure in the memory. The PPU then loads the task state defined by the task data structure from the memory and launches the processing task on a processing unit of the PPU.

As previously explained, when a processing task is selected for execution and launched, there is some amount of latency before one or more processing units begin executing the processing task. In particular, there is a latency resulting from the time needed to fetch the first program instruction for the processing task from the memory. There may also be some additional latency resulting from the time needed to fetch parameters from a portion of memory configured to store constants. The latency may be reduced by generating a cache warming instruction that is executed by the processing unit to load the parameters and/or a number of program instructions into a cache storage before the processing task is launched. When the processing task is launched, the processing unit may read the first program instruction directly from the cache storage rather than the memory, reducing the latency. The cache warming instruction may be executed by the processing unit while a previous processing task is executing so that at least a portion of, if not all of, the latency to launch the processing task corresponding to the cache warming instruction is "hidden" because execution of the warming instruction overlaps with execution of the previously launched processing task.

Figure 1:
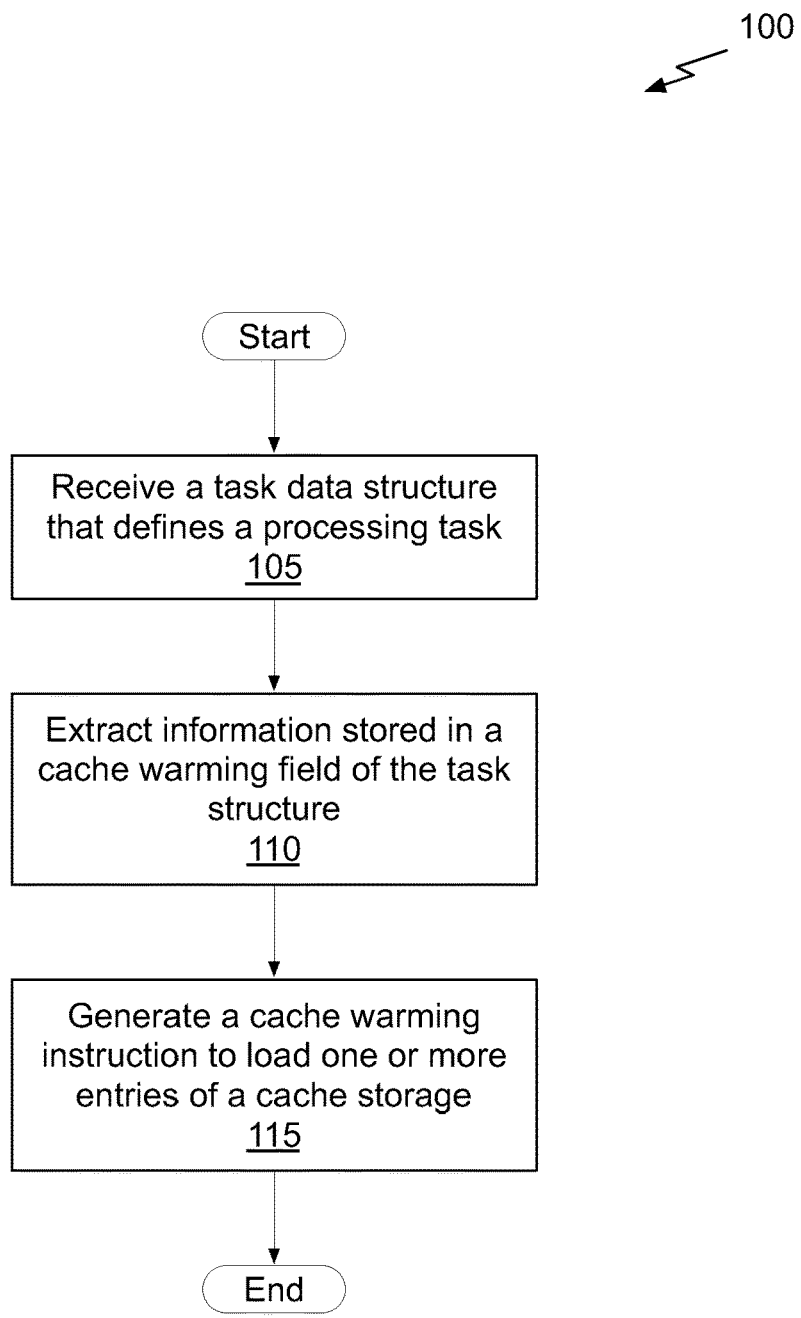
FIG. 1 illustrates a flowchart of a method 100 for warming a cache storage for the launch of a processing task, in accordance with one embodiment.

FIG. 1 illustrates a flowchart of a method 100 for warming a cache storage for the launch of a processing task, in accordance with one embodiment. At step 105, a task data structure that defines a processing task is received. In one embodiment, a driver kernel may be configured to generate the task data structure, store the task data structure in a memory, and provide a pointer to the task data structure. In the context of the following description, a task data structure comprises a plurality of bits representing one or more fields that encapsulate state information relating to a processing task. At step 110, information stored in a cache warming field of the task data structure is extracted. At step 115, a cache warming instruction that is configured to load one or more entries of a cache storage is generated. The one or more entries may be loaded with data (e.g., instructions, operands, variables, constants, pointers, or other types of data) fetched from a memory (e.g., register, static memory, dynamic memory, or other types of storage circuitry). The cache warming instruction should be generated before the processing task is launched.

In the context of the following description, a cache entry lay be a portion of or an entire cache line. In some possible embodiments, after the cache warming instruction is generated and output to a processing unit for execution, the processing task may be selected and launched. The state information utilized to launch the processing task is stored in the task data structure.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
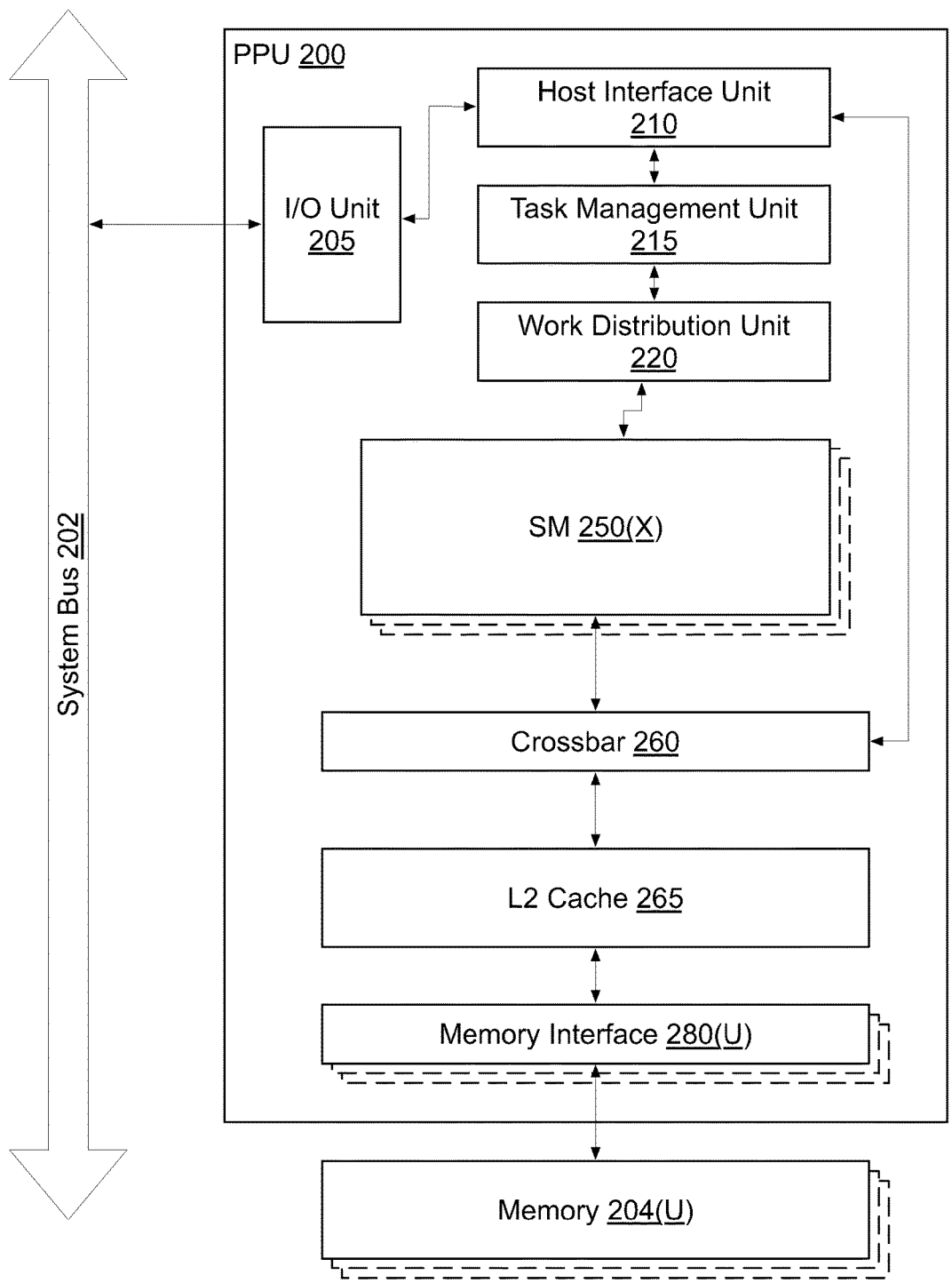
FIG. 2 illustrates a parallel processing unit, according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like, In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. In the context of the following description, the command stream may be a sequence of instructions that implement a shader program or a compute program. A driver kernel may also generate and store runtime state information corresponding to the command stream in a portion of memory that is allocated to store constant values, i.e., constant memory. In some possible embodiments, the driver kernel is a CUDA™ (compute unified device architecture) driver. The runtime state information is specific to the program encoded by the command stream and provides parameters that may be static during execution of the program and that configure one or more processing units within the SM 250, as needed, for execution of the program, The host interface unit 210 provides the task management unit (TMU) 215 with pointers to one or more streams. The TMU 215 selects one or more streams and is configured to organize the selected streams as a pool of pending processing tasks (i.e., grids). The pool of pending processing tasks may include new processing tasks that have not yet been selected for execution and processing tasks that have been partially executed and have been suspended.

A work distribution unit 220 that is coupled between the TMU 215 and the SMs 250 manages a pool of active processing tasks, selecting and dispatching active processing tasks for execution by the SMs 250. Pending processing tasks are transferred to the active processing task pool by the TMU 215 when a pending processing task is eligible to execute, i.e., has no unresolved data dependencies. An active processing task is transferred to the pending pool when execution of the active processing task is blocked by a dependency. When execution of a processing task is completed, the processing task is removed from the active processing task pool by the work distribution unit 220. In addition to receiving processing tasks from the host interface unit 210 and the work distribution unit 220, the TMU 215 also receives processing tasks that are dynamically generated by the SMs 250 during execution of a processing task. These dynamically generated processing tasks join the other pending processing tasks in the pending processing task pool.

The TMU 215 may be configured to generate a cache warming instruction for a processing task that is transferred from the pending pool to the active pool at the time when the processing task is transferred or at another time before the active processing task is selected for execution and launched (i.e., output to the work distribution unit 220). In some possible embodiments, cache warming instructions that are generated by the TMU 215 flow through the same pipeline stages as the launch commands. Therefore, the cache warming instructions reach the SMs 250 several clock cycles before the launch commands, reducing the latency incurred between when the processing task is launch and execution of the first program instruction begins.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more processing tasks for execution. In one embodiment, the PPU 200 implements a SIMD (Single-Instruction, Multiple-Data) architecture where each thread block (i.e., warp) in a processing task is concurrently executed on a different data set by different threads in the thread block. The driver kernel defines thread blocks that are comprised of k related threads, such that threads in the same thread block may exchange data through shared memory. In one embodiment, a thread block comprises 32 related threads and a processing task is an array of one or more thread blocks that execute the same stream and the different thread blocks may exchange data through global memory. A thread block may also be referred to as a cooperative thread array (CTA).

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250. When a cache warming instruction is received by an SM 250, the SM 250 may execute the cache warming instruction to fetch the data specified by the instruction operands and store the fetched data into one or more of the shared L2 cache 265 and the L1 cache. In one embodiment, the fetched data may he stored in other caches within the PPU 200 when a cache warming instruction is executed.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
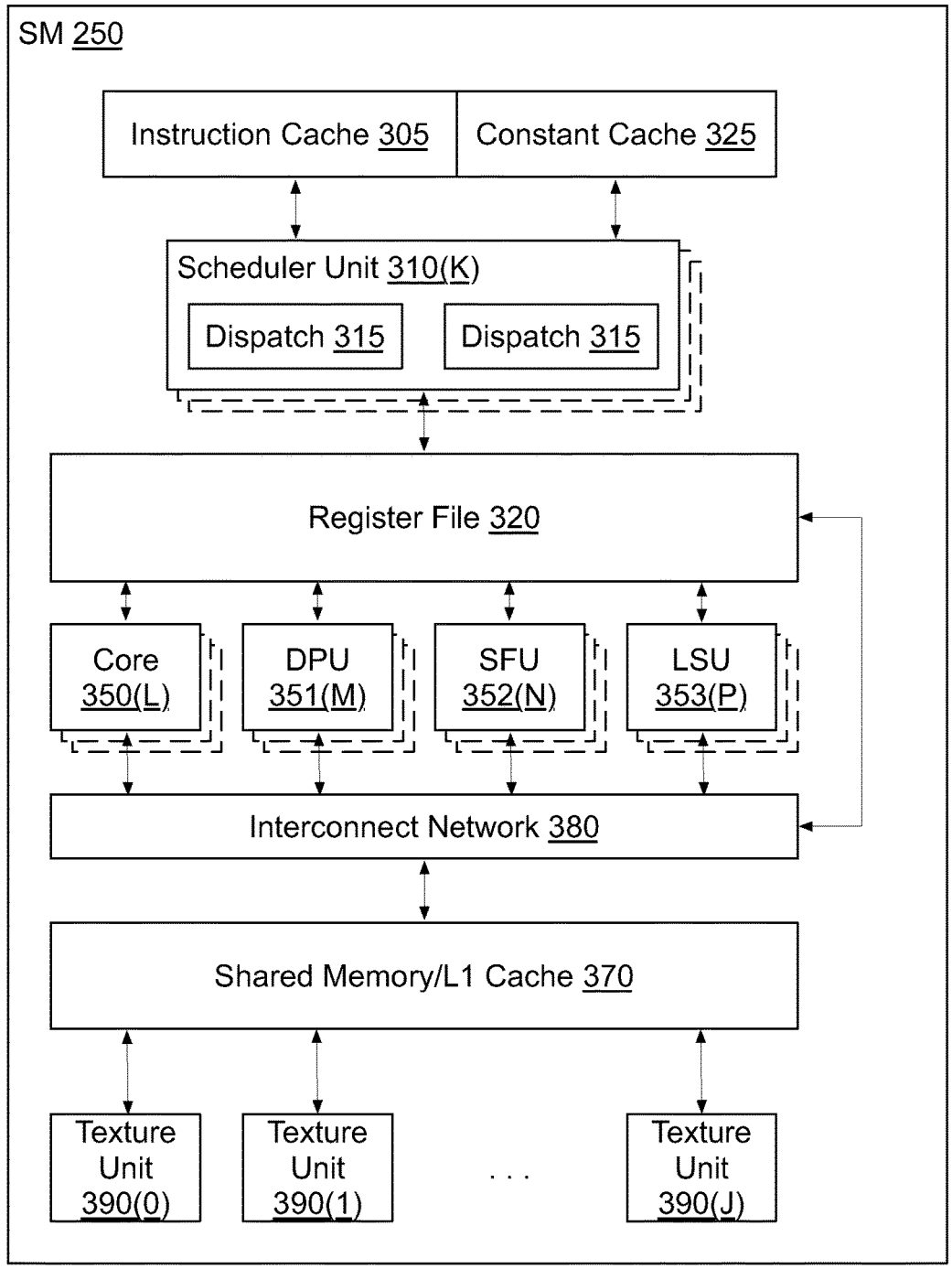
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, a constant cache 325, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

In one embodiment, the instruction cache 305 and constant cache 325 are combined into a single cache storage. A cache warming instruction may be configured to fetch either instructions or constants and store the fetched data in the instruction cache 305 or constant cache 325, respectively. In one embodiment, the fetched data may be stored in the shared memory/L1 cache 370 in addition to or in lieu of storing the fetched data in the instruction cache 305 and/or the constant cache 325. A cache warming instruction may specify one or more operands, such as a fetch type (e.g., instruction or constant), an address or an address offset corresponding to an address in memory (the offset may be relative to a base address), and a number of entries to write in the cache storage (i.e., amount of data to read from the memory).

As described above, the work distribution unit 220 dispatches active processing tasks for execution on one or more SMs 250 of the PPU 200. The work distribution unit 220 also broadcasts cache warming instructions received from the TMU 215 to one or more of the SMs 250. The scheduler unit 310 receives the processing tasks from the work distribution unit 220 and manages instruction scheduling for one or more thread blocks of each active processing task. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register the 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-abasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Task Management Unit

FIG. 4A illustrates a task metadata (TMD) 400 data structure, in accordance with one embodiment. The TMD 400 includes a plurality of fields that encapsulate state information associated with a task (i,e., task state). In one embodiment, the TMD 400 includes a program field 410, a constants field 415, a grid dimensions field 420, a block dimensions field 430, a resources field 440, a cache control field 450, a memory barriers field 460, and a semaphores field 470. Although not shown, the TMD 400 may include other fields in addition to the fields shown in FIG. 4A. It will be appreciated that the TMD 400 shown in FIG. 4A is for illustrative purposes only. The particular fields included in the TMD 400 encapsulate the task state required to configure a processing unit (e.g., the SM 250, texture unit 390, core 350, DPU 351, SFU 352, and/or LSU 353) to execute the processing task. Consequently, when a TMD 400 is implemented for different architectures, the corresponding TMD 400 may include fields in addition to or in lieu of the fields shown in FIG. 4A.

In one embodiment, the program field 410 is a cache warming field that stores at least a memory offset for the start of program instructions for the processing task. Similarly, the constants field 415 is another cache warming field that stores at least a memory offset for the start of the constants for the processing task. Details of the program field 410 and the constants field 415 are described in conjunction with FIGS. 4B and 4C, respectively. In one embodiment, the program field 410 and the constants field 415 are combined into a single cache warming field.

The grid dimensions field 420 includes grid dimensions for the processing task. A grid is an array of thread blocks generated to implement the program specified by the program offset field 410 on different sets of input data (e.g., pixel data) corresponding to each thread. The grid may be one-dimensional, two-dimensional, three-dimensional, or n-dimensional. In one embodiment, the grid dimensions field 420 includes an x-dimension, a y-dimension, and a z-dimension for the size of a three-dimensional grid array. The block dimensions field 430 stores the dimension for each of the thread blocks and is equal to the number of threads included in each thread block (e.g., 32). The resources field 440 includes state information related to hardware resources allocated to the processing task. For example, the resources field 440 may include a location and size of a circular queue, implemented in a memory, that stores thread blocks to be added to the processing task. The cache control field 450 includes data associated with configuring cache storage. For example, the cache control field 450 may include data that specifies what portion of the L1 cache/shared memory 370 is configured as a cache storage and what portion is configured as a shared memory. The cache control field 450 may also specify how much memory is allocated to each thread in a thread block. The memory barriers field 460 may include counters that are configured to manage processing task dependency. Similarly, the semaphores field 470 may include pointers to semaphores that should be released when a processing task is completed.

The TMD 400 defines, in the memory 204, the encapsulated state information necessary to execute a particular processing task on a processing unit of the PPU 200. In other words, the TMD 400 may be generated in the memory 204 and the fields of the TMD 400 may be filled by software, either a device driver, driver kernel, or application executing on the CPU or a different task executing on the PPU 200, and then a pointer to the TMD 400 is passed to the TMU 215 in the PPU 200 to indicate that the processing task is ready to be scheduled. In some system implementations, the TMD 400 for a processing task is written into a system memory (i.e., a memory associated with the CPU) and then copied to a video memory (i.e., memory 204). One mechanism for copying the task to the video memory involves transmitting packets of data from the system memory to the PPU 200 via the system bus 202. The PPU 200 then uses various hardware engines to store the data in the video memory. Once the PPU 200 is ready to schedule the processing task to be launched, the TMD 400 (or at least portions of the TMD 400) is read from the video memory into on-chip memory structures accessible by the TMU 215 and/or the SMs 250. However, the program field 410 and/or the constants field 415 of the TMD 400 for an active processing task may be read as soon as the processing task becomes active to generate one or more cache warming instructions.

FIG. 4B illustrates a program field 410 within the task data structure 400 of FIG. 4A, in accordance with one embodiment. The program field 410 may include a program offset 480, a program cache warm enable 482, and a program cache warm entries 484. Although not shown, the program field 410 may include other sub-fields in addition to the sub-fields shown in FIG. 4B. It will be appreciated that the program field 410 shown in FIG. 4B is for illustrative purposes only. The particular fields included in the program field 410 encapsulate the information required to generate a cache warming instruction to fetch one or more program instructions for the processing task.

The program offset sub-field 480 specifies a memory address or a memory offset (relative to abuse address) for the first program instruction in a command stream for the processing task. The program cache warm enable sub-field 482 indicates whether a cache warming instruction should be generated to fetch program instructions for the processing task. When the program cache warm enable sub-field 482 indicates that cache warming is disabled for program instructions, the TMU 215 does not generate a cache warming instruction to fetch the program instructions before the processing task is launched. When the program cache warm enable sub-field 482 indicates that cache warming is enabled for program instructions, the TMU 215 generates a cache warming instruction to fetch the program instructions before the processing task is launched.

The program cache warm entries sub-field 484 specifies a number N of entries (or program instructions) that should be fetched from the memory and stored in the cache storage (one or more of the instruction cache 305, the shared memory/L1 cache 370, the L2 cache 265, and another cache within the PPU 200).

FIG. 4C illustrates a constant field 415 within the task data structure 400 of FIG. 4A, in accordance with one embodiment. The constant field 415 may include a constant offset 490, a constant cache warm enable 492, and a constant cache warm entries 494. Although not shown, the constant field 415 may include other sub-fields in addition to the sub-fields shown in FIG. 4C. It will be appreciated that the constant field 415 shown in FIG. 4C is for illustrative purposes only. The particular fields included in the constant field 415 encapsulate the information required to generate a cache warming instruction to fetch one or more constants for the processing task.

The constant offset sub-field 490 specifies a memory address or a memory offset (relative to a base address) of the first constant for the processing task. In one embodiment, the constant offset sub-field 490 specifies a bank and offset within a portion of the memory. The constant cache warm enable sub-field 492 indicates whether a cache warming instruction should be generated to fetch constants for the processing task. When the constant cache warm enable sub-field 492 indicates that cache warming is disabled for constants, the TMU 215 does not generate a cache warming instruction to fetch the constants before the processing task is launched. When the constant cache warm enable sub-field 492 indicates that cache warming is enabled for constants, the TMU 215 generates a cache warming instruction to fetch the constants before the processing task is launched.

The constant cache warm entries sub-field 494 specifies a number M of entries (or constants) that should be fetched from the memory and stored in the cache storage (one or more of the constant cache 325, the shared memory/L1 cache 370, the L2 cache 265, and another cache within the PPU 200).

When a cache warming instruction is received by an SM 250, the SM 250 may execute the cache warming instruction to fetch the data (e.g., instructions, operands, variables, constants, pointers, or other types of data) or the SM 250 may discard the cache warming instruction without fetching the data. The decision to execute or discard the cache warming instruction may be based on operating conditions of the particular SM 250, such as whether an entry would need to be evicted to store the data or Whether the SM 250 is idle. In general, a cache warming instruction should not be executed by a particular SM 250 if execution may cause cache misses while other processing tasks that do not use the data to be fetched by the cache warming instruction are being executed by the SM 250.

Figure 5:
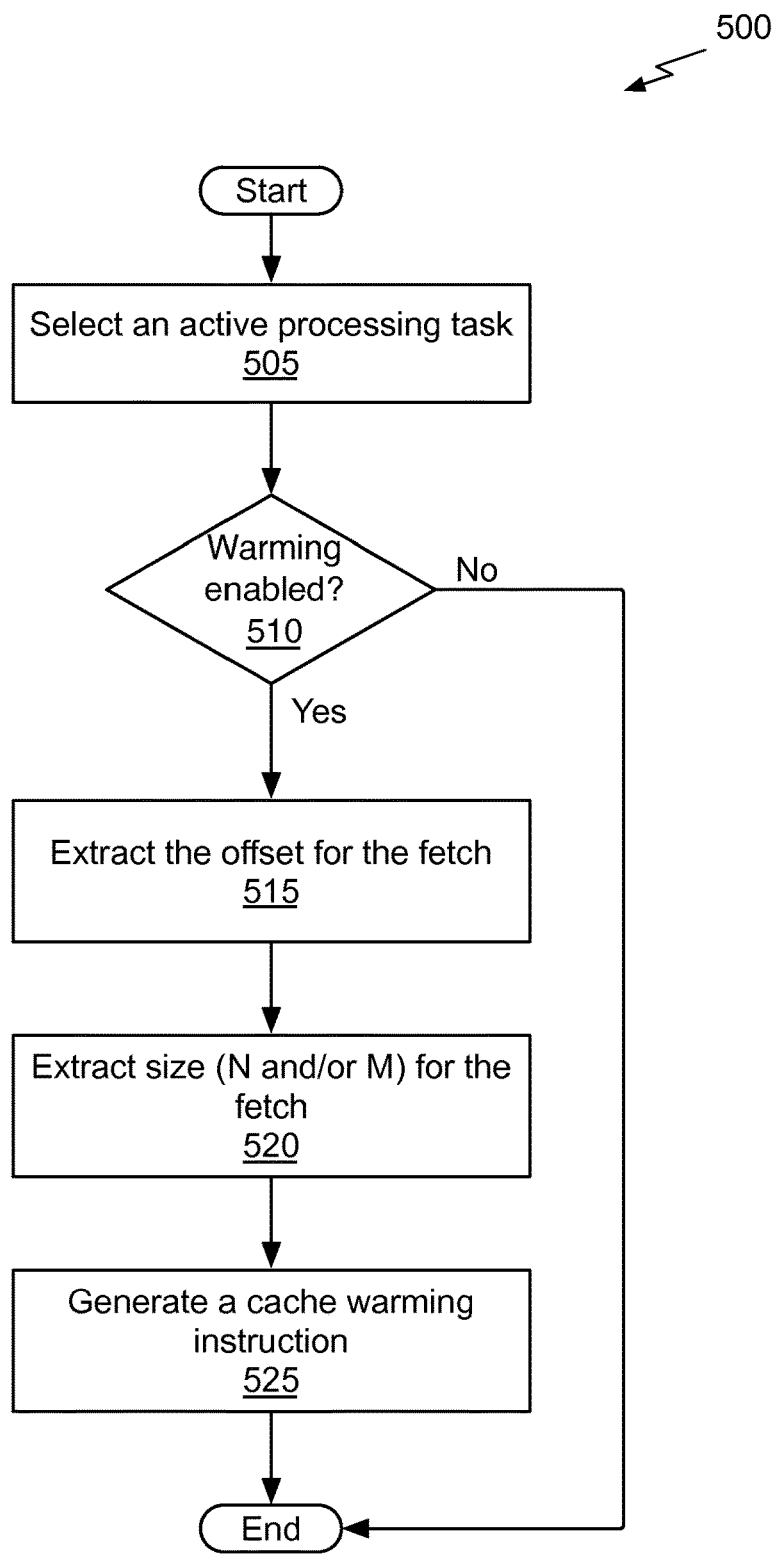
FIG. 5 illustrates a flowchart of a method for generating a cache warming instruction for a processing task, in accordance with one embodiment.

FIG. 5 illustrates a flowchart of a method 500 for generating a cache warming instruction for a processing task, in accordance with one embodiment. At step 505, an active processing task that is eligible to be launched is selected by the TMU 215. The selected processing task may be one that has just transitioned from pending to active or one that has been active for one or more clock cycles and will be launched. At step 510, the TMU 215 reads the program cache warm enable sub-field 482 and/or the constant cache warm enable sub-field 492 and determines if cache warming is enabled for the selected processing task. If cache warming is not enabled, then the TMU 215 does not generate a cache warming instruction for the processing task.

Otherwise, if cache warming is enabled for at least one of program instructions and constants, at step 515, the TMU 215 extracts the offset for the fetch from the program offset sub-field 480 and/or the constant offset sub-field 490. At step 520, the TMU 215 extracts a value N and/or M (the size of the memory fetch request) from the program cache warm entries sub-field 484 and/or the constant cache warm entries sub-field 494, respectively. In one embodiment, the values N and M correspond to the number of cache entries that will store the fetched program instructions and constants, respectively. Alternatively, the values N and M may be a number of dwords read from memory, a number of memory locations, or another value that indicates a portion of the memory or the cache storage.

At step 525, the TMU 215 generates at least one cache warming instruction including one or more of a first operand indicating the offset for the fetch and a second operand indicating the fetch size, N or M. When cache warming is enabled for program instructions, the TMU 215 generates a cache warming instruction for fetching program instructions that includes the program offset and the fetch size, N. When cache warming is enabled for constants, the TMU 215 generates a cache warming instruction for fetching constants that includes the constant offset and the fetch size, M. The cache warming instructions may be encoded as two different instructions depending on whether the cache warming instruction is configured to fetch program instructions or constants. In one embodiment, the TMU 215 may be configured to generate and output the cache warming instruction at least 50 clock cycles before the selected processing task is launched. In other embodiments, fewer or more that 50 clock cycles may transpire before a cache warming instruction is output by the TMU 215.

Figure 6:
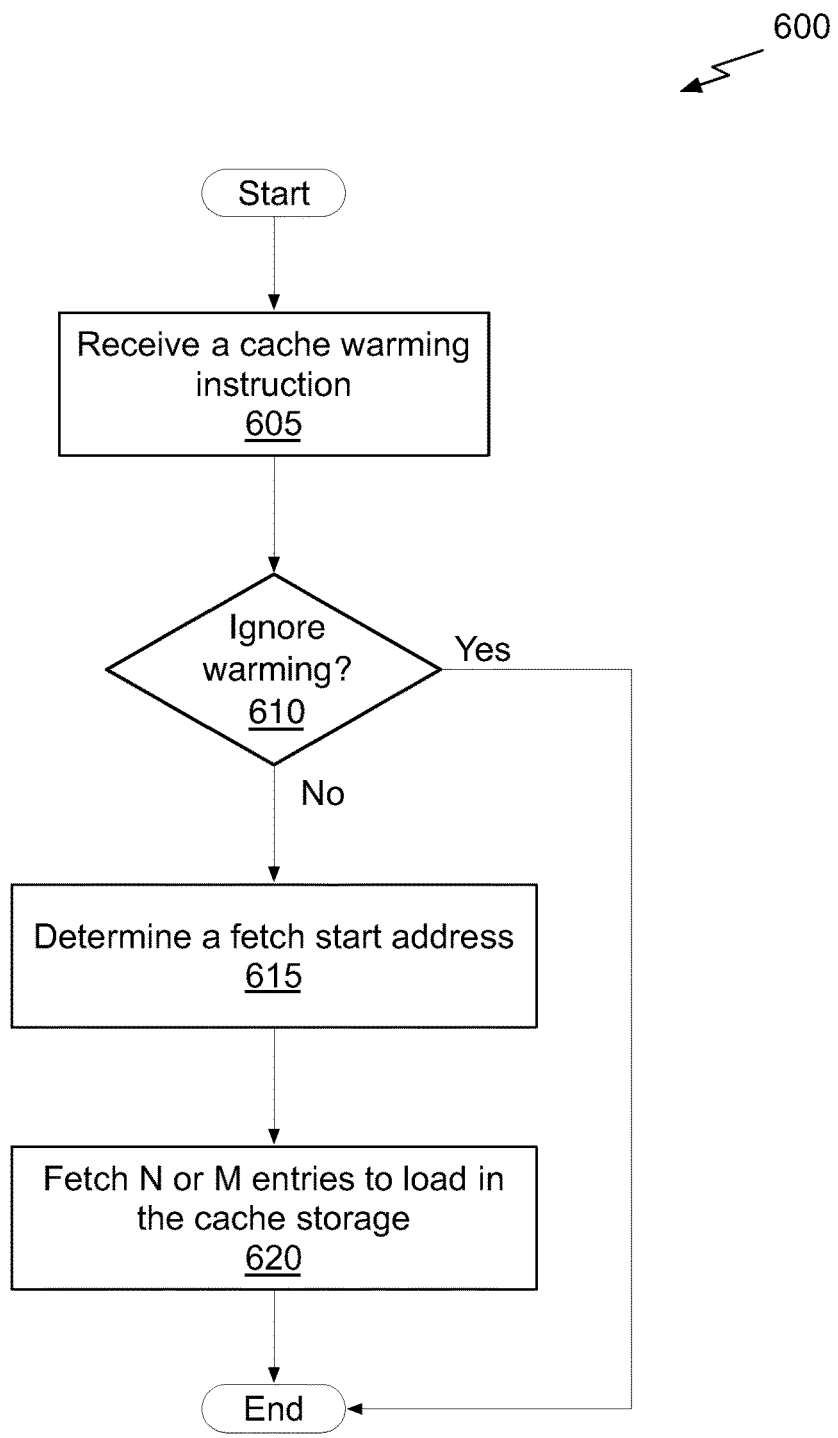
FIG. 6 illustrates a flowchart of a method for warming a cache storage, in accordance with one embodiment.

FIG. 6 illustrates a flowchart of a method 600 for warming a cache storage 605, in accordance with one embodiment. At step 605, a cache warming instruction is received by an SM 250. At step 610, the SM 250 determines if the cache warming instruction should be ignored (i.e., discarded and not executed). As previously described, the SM 250 may be configured to execute or discard cache warming instructions based on operating conditions. The decision to discard or execute a cache warming instruction may also be based on whether the cache warming instruction is for fetching program instructions or for fetching constants. For example, in some embodiments, a cache warming instruction for fetching constants is discarded while a cache warming instruction for fetching program instructions is executed or the cache warming instruction for fetching constants is executed while the cache warming instruction for fetching program instructions is discarded.

If, at step 610, the SM 250 determines that the cache warming instruction should be discarded, then the SM 250 discards the cache warming instruction and processing of the cache warming instruction is complete. Otherwise, the cache warming instruction should be executed, and, at step 615, the SM 250 determines a fetch start address based on the first operand (i.e., the offset). At step 620, the SM 250 generates memory fetch requests to fetch an amount of data from memory according to the second operand (i.e., the value N or M). When the fetched data is returned by the memory, the data is loaded in the cache storage. In one embodiment, the cache warming instruction is output directly to a cache and is executed by the cache. For example, the cache warming instruction may be output directly from the TMU 215 to one or more of the caches (e.g., instruction cache 305, constant cache 325, shared/memory/L1 cache 370, and/or L2 cache 265).

Figure 7:
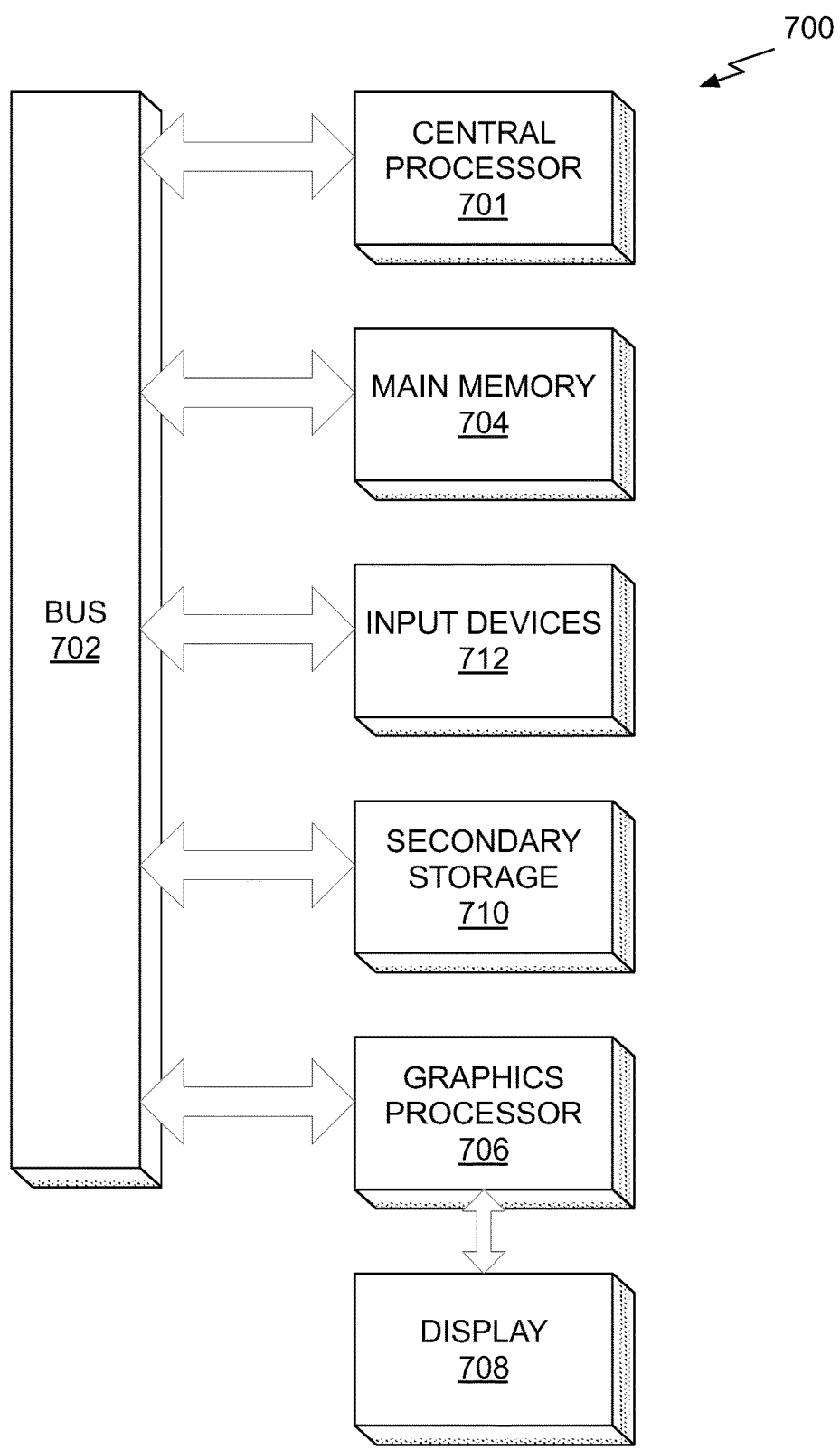
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU). Techniques for generating and executing cache warming instructions, described above, may be implemented on the graphics processor 706 of FIG. 7.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
 receiving, by a task management unit within a parallel processor, a task data structure that defines a processing task;
 extracting information stored in a cache warming field of the task data structure; and
 generating, by the task management unit prior to execution of the processing task by a processing core within the parallel processor, a cache warming instruction that is configured to load one or more entries of a cache storage with data fetched from a memory when executed by the processing core.

2. The method of claim 1, further comprising, prior to generating the cache warming instruction, activating the processing task so that the processing task is eligible to be launched.

3. The method of claim 1, wherein the cache storage is configured to store constants referenced by the processing task.

4. The method of claim 1, wherein the cache storage is configured to store program instructions for the processing task.

5. The method of claim 1, wherein the information includes a number of cache entries to load and the number of cache entries to load is an operand of the cache warming instruction.

6. The method of claim 1, wherein the information includes an offset address within a portion of the memory that stores program instructions for the processing task and the offset address is an operand of the cache warming instruction.

7. The method of claim 1, wherein the information includes an offset address within a portion of the memory that stores constants referenced by the processing task and the offset address is an operand of the cache warming instruction.

8. The method of claim 1, wherein the information indicates that cache warming is enabled for the processing task.

9. The method of claim 1, further comprising:
receiving, by the processing core, the cache warming instruction;
determining that the cache warming instruction should be ignored; and
discarding the cache warming instruction.

10. The method of claim 1, further comprising:
receiving, by the processing core, the cache warming instruction;
determining that the cache warming instruction should be executed;
fetching the data from the memory according to the cache warming instruction; and
storing the data in one or more entries of the cache storage.

11. The method of claim 1, further comprising launching the processing task for execution by the processing core, wherein the launching occurs at least 50 clock cycles after the cache warming instruction is generated.

12. A system, comprising:
a memory;
a parallel processor comprising:
processing cores;
a cache storage coupled to the memory; and
a task management unit configured to:
receive a task data structure that defines a processing task;
extract information stored in a cache warming field of the task data structure; and
generate, prior to execution of the processing task by at least one of the processing cores, a cache warming instruction that is configured to load one or more entries of the cache storage with data fetched from the memory when executed by at least one of the processing cores.

13. The system of claim 12, wherein, before generating the cache warming instruction, the task management unit is further configured to activate the processing task so that the processing task is eligible to be launched.

14. The system of claim 12, wherein the cache storage is configured to store constants referenced by the processing task.

15. The system of claim 12, wherein the cache storage is configured to store program instructions for the processing task.

16. The system of claim 12, wherein the information includes a number of cache entries to load and the number of cache entries to load is an operand of the cache warming instruction.

17. The system of claim 12, wherein the information includes an offset address within a portion of the memory that stores program instructions for the processing task and the offset address is an operand of the cache warming instruction.

18. A non-transitory computer-readable storage medium storing instructions that, when executed by a processor, cause the processor to perform steps comprising:
receiving, by a task management unit within a parallel processor, a task data structure that defines a processing task;
extracting information stored in a cache warming field of the task data structure; and
generating, by the task management unit prior to execution of the processing task by a processing core within the parallel processor, a cache warming instruction that is configured to load one or more entries of a cache storage with data fetched from a memory when executed by the processing core.

19. The method of claim 1, further comprising broadcasting the cache warming instruction to multiple processing cores.

20. The system of claim 12, further comprising a work distribution unit that is coupled between the task management unit and the processing cores and configured to broadcast the cache warming instruction to at least two of the processing cores.

* * * * *